US011205219B2

United States Patent
de Sousa Moura et al.

(10) Patent No.: US 11,205,219 B2
(45) Date of Patent: Dec. 21, 2021

(54) METHOD, SYSTEM, AND ONE OR MORE NON-TRANSITORY COMPUTER-READABLE STORAGE MEDIA FOR AUGMENTED REALITY ASSISTANT FOR TRANSACTIONS

(71) Applicant: Accenture Global Solutions Limited, Dublin (IE)

(72) Inventors: Paulo Victor de Sousa Moura, Recife (BR); Luiz Felipe Sampaio de Oliveira, Recife (BR)

(73) Assignee: Accenture Global Solutions Limited, Dublin (IE)

( * ) Notice: Subject to any disclaimer, the term of this patent is extended or adjusted under 35 U.S.C. 154(b) by 211 days.

(21) Appl. No.: 16/282,069

(22) Filed: Feb. 21, 2019

(65) Prior Publication Data
US 2019/0266661 A1 Aug. 29, 2019

Related U.S. Application Data

(60) Provisional application No. 62/635,142, filed on Feb. 26, 2018.

(51) Int. Cl.
*G06Q 30/00* (2012.01)
*G06Q 30/06* (2012.01)
(Continued)

(52) U.S. Cl.
CPC ......... *G06Q 30/0643* (2013.01); *G06N 20/00* (2019.01); *G06Q 30/0215* (2013.01);
(Continued)

(58) Field of Classification Search
CPC . G06Q 30/0601–0645; G06Q 30/0643; G06Q 30/0215; G06Q 40/025; H04L 9/0637; H04L 2209/38; G06N 20/00
(Continued)

(56) References Cited

U.S. PATENT DOCUMENTS 10,339,583 B2 7/2019 Waldron et al.
2012/0232968 A1\* 9/2012 Calman ............ G06Q 20/3276
705/14.4
(Continued)

OTHER PUBLICATIONS

Hall, Jason. How Augmented Reality is Changing the World of Consumer Marketing. Nov. 8, 2017. Published by Forbes. Accessed via https://www.forbes.com/sites/forbesagencycouncil/2017/11/08/how-augmented-reality-is-changing-the-world-of-consumer-marketing/?sh=3a61e34254cf (Year: 2017).\*

*Primary Examiner* — Allison G Wood
(74) *Attorney, Agent, or Firm* — Fish & Richardson P.C.

(57) ABSTRACT

Techniques are described for capturing an image of a physical object, and presenting the image in an augmented reality (AR) user interface (UI) with an overlay that includes context information regarding physical object in the image. An application running on a portable computing device receives an object image captured using the device camera. The application, and/or a remote service, analyzes the image to identify the object. Context data describing the object is determined and presented through the application's AR UI. The AR UI can also provide a real time communication session in which the user interacts with a service representative or bot to discuss a loan to purchase the object. Implementations also provide points to the user for taking out a loan to purchase a product, such points redeemable for discounts on future purchases. Point data for the user can be stored on a distributed ledger network.

18 Claims, 7 Drawing Sheets

(51) Int. Cl.
 *G06Q 40/02* (2012.01)
 *H04L 9/06* (2006.01)
 *G06N 20/00* (2019.01)
 *G06Q 30/02* (2012.01)

(52) U.S. Cl.
 CPC ......... *G06Q 40/025* (2013.01); *H04L 9/0637* (2013.01); *H04L 2209/38* (2013.01)

(58) Field of Classification Search
 USPC .......................................... 705/26.1–27.2, 38
 See application file for complete search history.

(56) References Cited

U.S. PATENT DOCUMENTS

| | | | |
|---|---|---|---|
| 2013/0329943 A1* | 12/2013 | Christopulos | G06K 9/00671 382/103 |
| 2016/0109954 A1* | 4/2016 | Harris | G06K 9/00671 345/156 |
| 2017/0024759 A1* | 1/2017 | Taneja | G06Q 20/34 |
| 2018/0136465 A1* | 5/2018 | Chi | G06F 3/0416 |
| 2018/0150899 A1 | 5/2018 | Waldron et al. | |
| 2018/0150903 A1 | 5/2018 | Waldron et al. | |
| 2018/0158156 A1 | 6/2018 | Dintenfass | |
| 2018/0158157 A1 | 6/2018 | Dintenfass | |
| 2019/0080171 A1* | 3/2019 | Zheng | G06T 11/60 |
| 2019/0188788 A1 | 6/2019 | Baker et al. | |
| 2019/0228450 A1 | 7/2019 | Waldron et al. | |

\* cited by examiner

METHOD, SYSTEM, AND ONE OR MORE NON-TRANSITORY COMPUTER-READABLE STORAGE MEDIA FOR AUGMENTED REALITY ASSISTANT FOR TRANSACTIONS

CROSS-REFERENCE TO RELATED APPLICATION

The present disclosure is related to, and claims benefit of, U.S. Provisional Patent Application No. 62/635,142, titled "AUGMENTED REALITY ASSISTANT FOR TRANSACTIONS," which was filed on Feb. 26, 2018, and the entire contents of which are incorporated by reference into the present disclosure.

BACKGROUND

In the course of their daily lives, individuals may encounter various items that are available for purchase. For items that are expensive, an individual may use some form of financing to purchase the item. However, traditional processes used to apply for financing can be cumbersome and time-consuming. Accordingly, some individuals may forego making a purchase instead of spending the time and effort to navigate a complex loan application process.

SUMMARY

Implementations of the present disclosure are generally directed to image capture and analysis, and presenting context data regarding the imaged object. More specifically, implementations are directed to capturing an image of an object available for purchase (or otherwise acquirable), and providing context data regarding the object in an augmented reality interface. In some implementations, the context data includes a description of a loan that can be used to purchase the object.

In general, innovative aspects of the subject matter described in this specification can be embodied in methods that include operations of: receiving at least one image of a physical object, the at least one image generated using a camera of a portable computing device; providing the at least one image to a model that executes on the portable computing device and receiving, as output from the model, an identification of the physical object, wherein the model is configured to provide an identification of the physical object based on one or more input images; accessing context data that describes the physical object, the context data determined based on the identification of the physical object, the context data including loan data that describes terms of a loan to facilitate purchase of the physical object; and presenting the context data including the loan data in an augmented reality (AR) interface executing on the portable computing device.

Implementations can optionally include one or more of the following features: the context data is presented with the at least one image in the AR interface; the model has been trained, using machine learning (ML), to provide the identification of the physical object; presenting the context data further includes initiating a communication session between a user of the portable computing device and a service representative; the communication session is one or more of a text chat session and a voice chat session; point data for a user of the portable computing device is updated responsive to receiving an indication of a loan application for the loan; the point data is stored on a distributed ledger network (DLN); and/or the operations further include receiving the point data describing a current number of points available to the user, and displaying the point data in the AR interface executing on the portable computing device.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1A:
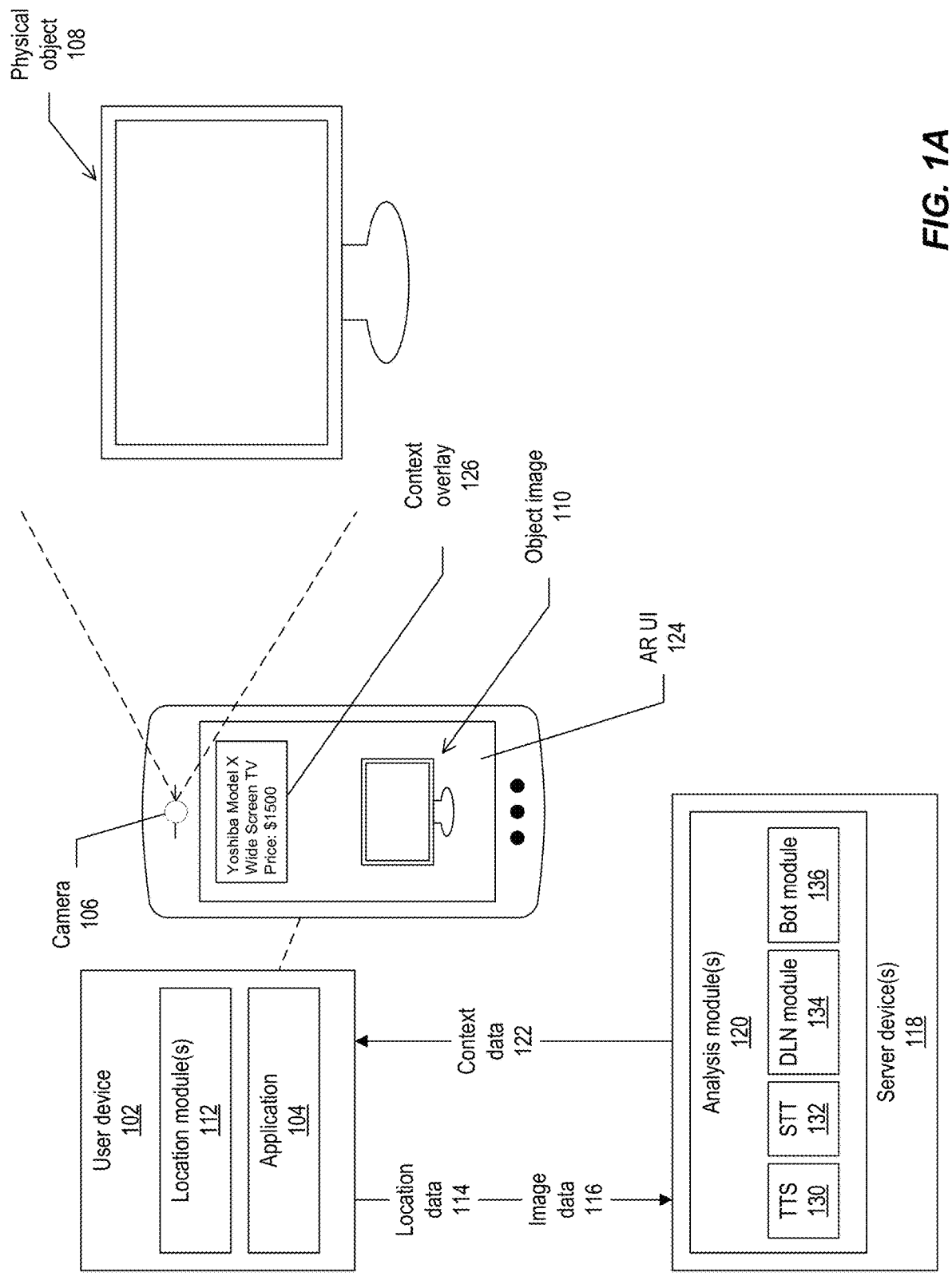
FIGS. 1A-1D depict example systems, according to implementations of the present disclosure.

Implementations of the present disclosure are directed to systems, devices, methods, and computer-readable media for capturing an image of some type of physical object, and presenting the image in a user interface (UI) with an augmented reality (AR) overlay that includes context information regarding the physical object in the image. An application running on a portable computing device (e.g., smartphone, tablet computer, etc.) receives an image of the object that is captured using a camera of the portable computing device. The application may transmit the image(s) of the object to a remote service that performs an initial analysis of the image(s) to identify the object. For example, the image(s) may be analyzed using pattern recognition, image-matching, and/or other suitable algorithms to identify the imaged object. In some instances, the image can include text, identification numbers, other (e.g., alphanumeric) text data, and/or encoded information (e.g., in a QR code or other scannable barcode) that is analyzed using suitable methods to identify the object. The remote service can analyze the image(s) and generate context data regarding the physical object, and the context data can be presented in an AR interface on the portable computing device, e.g., as an overlay and/or supplement to the image(s) of the object.

In some implementations, the service provides an automated process that interacts with the user to provide at least a portion of the context information. The automated process is also referred to herein as a bot. For example, the bot can interact with the user to offer, and/or negotiate, the terms of a loan that is to be provided to the user to facilitate their purchase of the object. For example, the bot can offer a loan of a particular amount, at a particular interest rate, with a particular term and payment(s) scheduled. The user can interact with the bot to request different terms, which the bot can accept or deny. On agreeing to the terms of a loan, the service can initiate a transfer of funds, the loan amount, into an account (e.g., a bank account) of the user. The user can then use the funds to purchase the item.

In some implementations, the service provides points as a reward for users using the service to finance their purchases. Such points can also be described as reward points or loyalty points. Points can be awarded to a user each time they agree to a loan to finance a purchase through the service. The points can be redeemed in exchange for discounts on subsequently purchased products. In some implementations, point data that describes the number of points earned by various users can be stored on a blockchain network or other suitable distributed ledger network (DLN), to ensure security and confidentiality, and/or prevent fraud related to the points. In some implementations, the DLN used to store the point data can be a private DLN that is accessible by partners (e.g., banks or other financial institutions) who are involved in the lending process to provide loans to the users. The blockchain network or other DLN can provide data storage that is distributed across multiple nodes, secured against unauthorized access, encrypted, and immutable such information written to the DLN cannot be altered once it is written.

FIGS. 1A-1D depict example systems for analyzing an image 110 of a physical object 108, determining context data 122 that describes the object 108, and presenting at least a portion of the context data 122 as a context overlay 126 to the object image 110, in an AR UI 124. A user device 102 executes an application 104. Implementations support the use of any suitable type of user device 102 that a user can use to interact with the application 104. For example, the user device 102 can be a portable computing device such as a smartphone, tablet computer, wearable computer, and so forth. In some implementations, the application 104 may be an AR application that executes on a computing device and that provides an AR interface. Alternatively, the application 104 can also be any other suitable type of application, such as a web application executing in a browser or other container for web content, or a mobile application (app) configured to execute on the user device 102.

The user device 102 can include one or more cameras 106 that capture image(s) and/or video data of a field of view in proximity to the user device 102. In some instances, the camera(s) 106 may be peripheral device(s) that are connected to the user device 102 over a wired or wireless network, and are not built-in components of the user device 102. The camera(s) 106 can capture one or more image(s) 110, and/or video data, of a physical object 108. In the example shown, the imaged object 108 is a consumer product such as a television. Implementations support the imaging and analysis of other types of objects as well. In some instances, the object 108 is a high-value (e.g., high-priced) object that would be a special, rare, or uncommon purchase for a user, such as a consumer electronics device, a vehicle, a work of art, jewelry, and so forth. The image data 116 generated by the camera(s) can include any suitable number of still image(s) 110 and/or video data of the imaged object 108.

The image data 116, including image(s) and/or video of the object 108, can be analyzed to identify the object 108 and determine context data (e.g., metadata) that describes the object. In some implementations, such analysis can be performed at least partly on the user device 102. Alternatively, as shown in the example of FIG. 1A, the analysis can be performed by analysis module(s) 120 executing on one or more server devices 118 that are remote from the user device 102. The server device(s) 118 can include any suitable number and type of computing devices, including distributed computing devices (e.g., cloud computing servers). The server device(s) 118 can receive the image data 116 that is transmitted from the user device 102 over one or more networks.

The analysis of the image data 116 can include pattern recognition to recognize the object in the image(s), and/or image comparison to find image(s) of object(s) that are most similar (e.g., through a statistical comparison of the images) to the image(s) generated by the user device 102. Image data analysis can also include analysis to recognize alphanumeric text or other symbols present on the object, such as brand names, model names, vehicle identification numbers (VINs), and so forth. In some implementations, the image analysis includes capturing and analyzing a barcode, such as a one-dimensional scannable barcode (e.g., UPC code) or multi-dimensional scannable barcode (e.g., QR code) that is displayed on or in proximity to the object 108. Such a barcode can include information that identifies and/or otherwise describes the object, and the barcode can be decoded to identify the object and/or otherwise retrieve the encoded context data regarding the object.

The image analysis can include one or more of the following: optical character recognition (OCR), optical word recognition (OWR), intelligent character recognition (ICR), intelligent word recognition (IWR), natural language processing (NLP), machine learning, parsing, and/or other techniques for identifying particular text elements, image pattern recognition, image comparison, image searching for matching images of known products, and/or the capturing and decoding of barcodes including but not limited to UPC codes and/or QR codes.

Based on the identification of the object, the analysis module(s) 120 and/or application 104 can generate context data 122 that describes the object, such as a product name, model number, year of manufacture, description of features, price, warranty information, information comparing the imaged object to other comparable products of a similar type, and so forth. The context data 122 may be metadata and/or descriptive information that provides further context and/or information regarding the object 108. In some implementations, the context data 122 is retrieved from a table, file system, database, or other data structure that stores one or more elements of context data 122 corresponding to particular object shown in the image data 116. The elements of context data 122 corresponding to object 108 can be retrieved from such data storage.

In some implementations, the context data 122 is communicated, over one or more networks, from the server device(s) 118 to the user device 102. The application 104 generates a context overlay 126 that includes at least a portion of the context data 122. In some implementations, the context overlay 126 is presented in an AR UI 124, as an overlay that is over or near the presented image of the object, as shown in the example of FIG. 1A. Accordingly, the user viewing the context overlay 126 that is overlaid on the object image 110 may readily perceive that the context data 122 is associated with the object image 110, providing additional context and/or descriptive information regarding the object 108.

In some implementations, the user device 102 executes location module(s) 112 that determine a current location of the user device 102 when the image(s) are captured. For example, the location module(s) 112 may receive and analyze signals from a satellite-based navigation system, such as a version of the global positioning system (GPS) or other suitable system, to determine the current location of the user device 102. Other suitable techniques for location determination can also be employed. Based on the location data 114 describing the location of the user device 102, one or more partner merchants can be identified that are in proximity to the user device 102. A partner merchant may be a merchant that has agreed to participate in the lending service that is facilitated through the AR context data presentation described herein. For example, on determining that the current location of the user device 102 (e.g., the current location of the user) is at or in proximity to at least one partner merchant, the application 104 can present a notification indicating that the user is at or in proximity to the partner merchant(s). The application 104 can then launch the various features that can be used to capture image(s) of products offered by the merchant(s), analyze the image(s) to determine context data, and present the context data including generating and presenting the terms of a loan to purchase the product(s), as described herein. The location data 114 can be analyzed on the user device 102 and/or on the service device(s) 118, as shown in the example, to identify nearby partner merchant(s). The location data 114 can described location using location coordinates, such as latitude and longitude of the current location, or some other suitable format for describing the current location, such as a street address.

In some implementations, the user may be authenticated by the application and/or the server device(s) 118 prior to receiving access to the features of the application 104 for imaging objects and viewing context overlays. Such authentication can be through credentials such as username, password, personal identification number (PIN), knowledge-based question and answer (e.g., what is your favorite pet's name?), and so forth. Authentication may also be through the collection and verification of biometric data for the user, such as the user's fingerprint, retinal scan, facial recognition, voice print recognition, heart rate/pulse measurement, neural activity (e.g., brain wave scan), and so forth.

As shown in the example of FIG. 1A, the context overlay 126 can present context data such as an identification of the object (e.g., product name, model, year, etc.), a description of the object (e.g., product features, etc.), a price of the object (e.g., as offered by the merchant and/or elsewhere), and/or other information regarding the product. The AR UI 124 can also present an image of the object, such as the image captured by the camera of the user device 102.

The analysis module(s) 120 can include one or more of a text-to-speech (TTS) module 130, a speech-to-text (STT) module 132, a DLN module 134 (e.g., a blockchain node or node of some other DLN), and a bot module 136. The TTS module 130 and the STT module 132 convert, respectively, text data to speech audio output and speech audio input to text data. The DLN module 134 can provide a node of a DLN where point data (e.g., for loyalty points) stored, or otherwise facilitate access to and updates to the data on the DLN. The bot module 136 can provide an interactive chat session with the user of the user device 102, to enable the user and a service representative to discuss the terms of the loan to be given to the user to facilitate their purchase of the object, as described further below. The interactive chat session (also described as a communication session) can be a text chat session and/or a voice chat session (e.g., using VOIP technology and/or telephone networks).

Figure 1B:
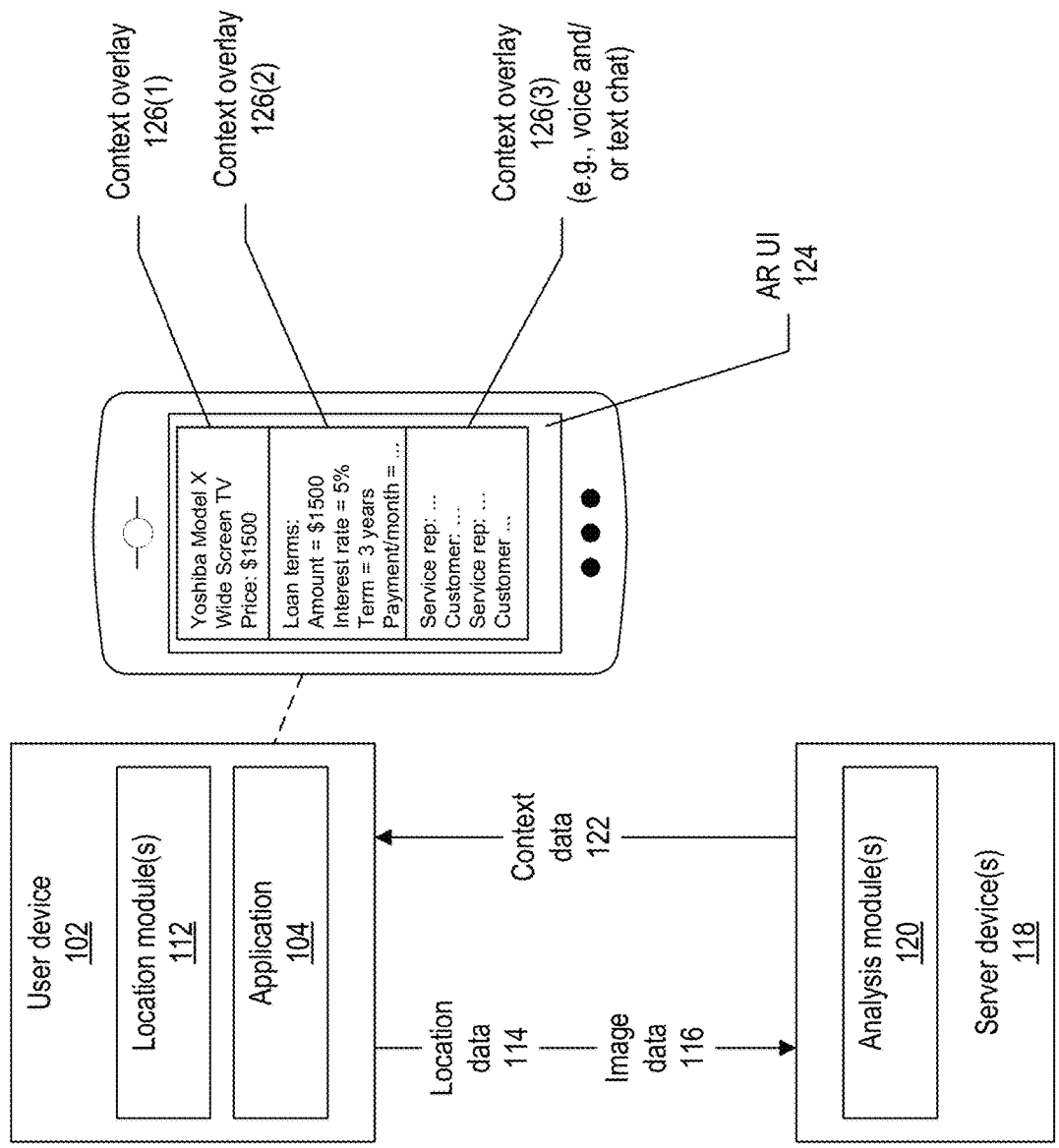

As shown in the example of FIG. 1B, in some implementations the context data presented in the overlay includes control(s) that are selectable, by the user, to request and initiate a chat session between the user some other individual, such as a customer service representative. The chat session may be a video chat session, an audio chat session (e.g., telephone call or VOIP call), a text chat session, and so forth. During the session, the user and other individual may discuss the terms of a loan to be given to the user to finance their purchase of the object. For example, a loan officer of a bank may discuss a loan application with the user, and the terms of the loan such as the principle amount, interest rate, term (e.g., time in which the loan is to be repaid), frequency of payments (e.g., monthly), amount of (e.g., monthly) payments, and/or other terms. In general, the context data in the overlay may include any suitable type and format of information, such as text data, video data, audio data, other image(s), graphics, dynamic selectable controls, and so forth. In the example of FIG. 1B, the context overlay includes a section 126(1) that presents a name and description of the object, a section 126(2) that presents the proposed terms of the loan to be provided to the user, and a section 126(3) that provides the interactive communication session between the user and the service representative. In the example shown, the communication session is a text chat session. Alternatively, the communication session can be a voice chat session that is facilitated by the STT and TTS module(s). Such voice chat may be more convenient to the user, given that text input and reading may be minimized, allowing the user to discuss the product while examining it at the merchant.

Although the examples of FIGS. 1A and 1B show the location module(s) 112 executing on the user device 102, in some implementations the location module(s) 112 can execute on the server device(s) 118 instead of or in addition to executing on the user device 102, such that one or more operations for determining the current location of the user device 102 are performed on the server side. Moreover, although the examples show the STT, TTS, DLN, and bot modules executing on the server device(s) 118, in some implementations one or more of these module(s) can execute on the user device 102 instead of or in addition to executing on the server device(s) 118, such that at least a portion of the operations performed by one or more of the respective modules is performed on the user device 102.

Figure 1C:
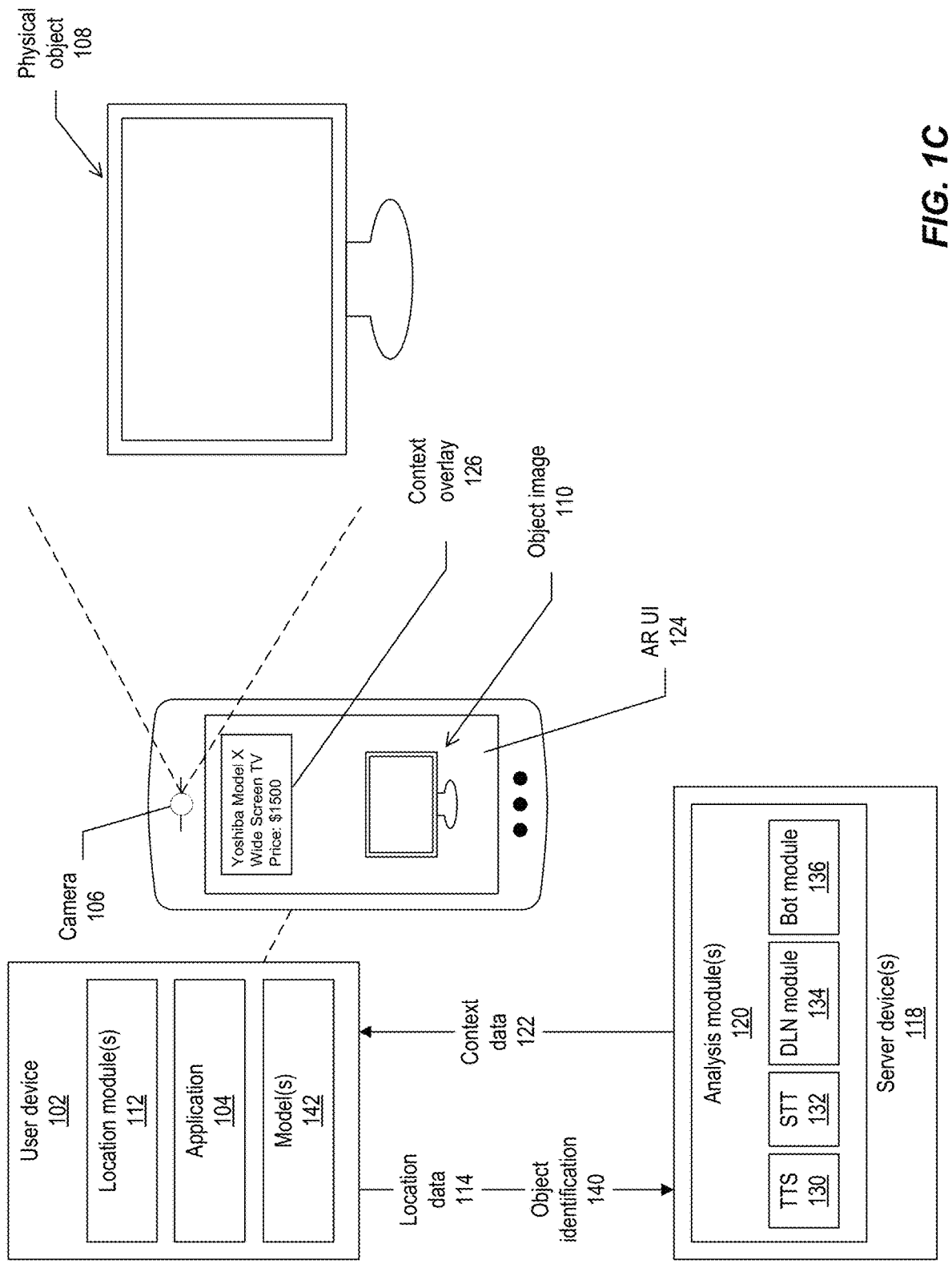
Figure 1D:
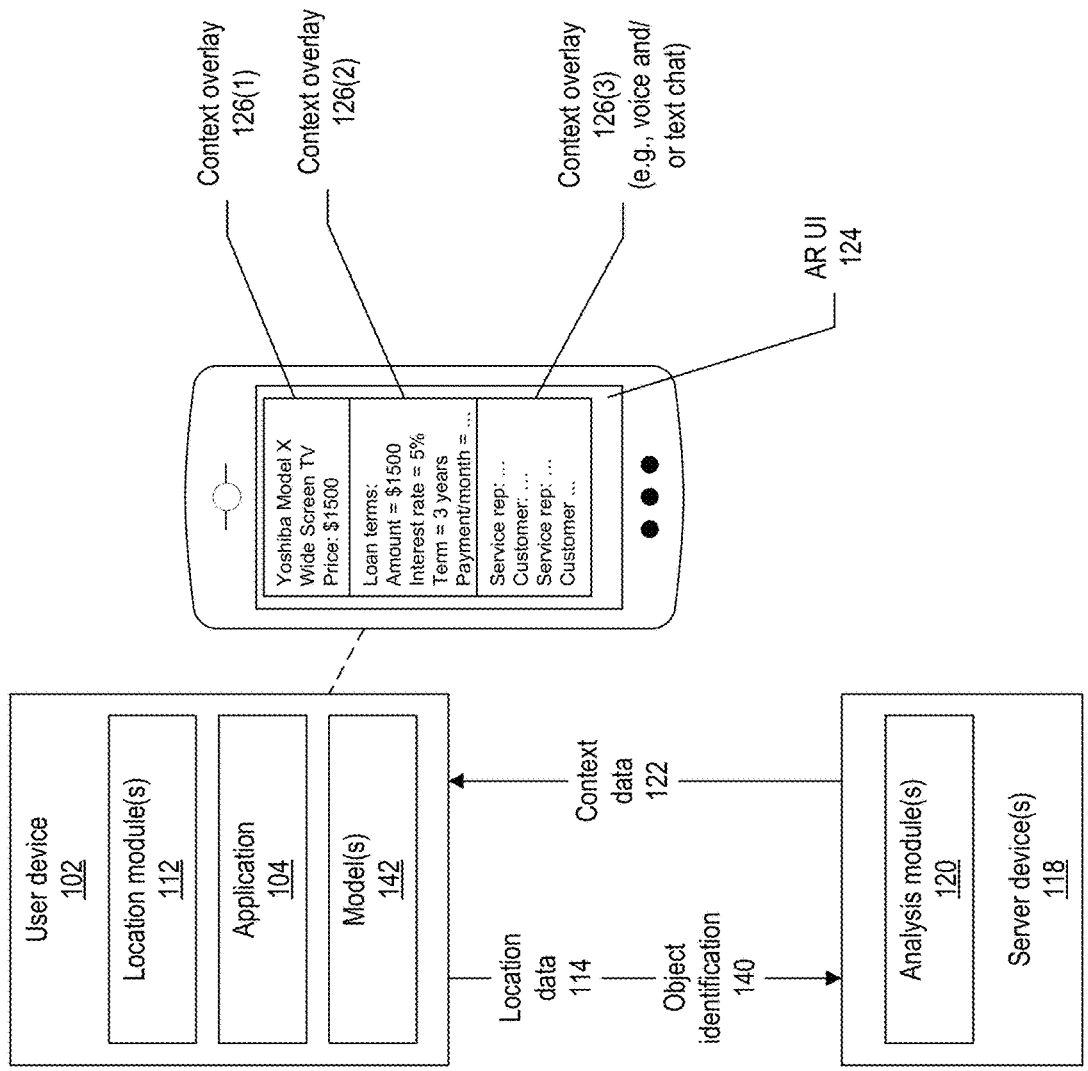

In some implementations, the analysis of the image(s) to identify the object can be performed at least partly on the user device 102. In the example of FIGS. 1C and 1D, one or more models 142 are present on the user device 102. Such model(s) 142 can be trained, using ML techniques, to identify objects shown in input image(s). The model(s) 142 can be used to identify the object on the user device 102, and the objection identification 140 can be transmitted to the server device(s) 118 for use in generating the context data 122. In some implementations, the model(s) 142 can be trained elsewhere (e.g., on the server device(s) 118) and communicated to the user device 102 for storage and use on the user device 102. The model(s) 142 may be periodically retrained and updated to the user device 102. The model(s)

142 may also include any suitable software that performs NLP, QR code decoding, and/or other analysis to determine the object identification based on the image(s) captured of the object.

As described above, in some implementations a DLN is accessible through the DLN module 134 and used to store point data for one or more users, and/or other information. In some implementations, the DLN includes one or more blockchains. A blockchain is a public or private ledger of transactions that have been executed in one or more contexts (e.g., negotiable instrument transactions, digital currency transactions, access determinations, instances of providing access, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device (or a cluster of multiple devices) that uses a client to validate and relay transactions. Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). Blockchains may also employ other protocols. In this context, the work is a task that is difficult for any single node (e.g., computing device) in the peer-to-peer network to quickly complete, but is relatively easy for a node (e.g., computing device) to verify.

The peer-to-peer network can include so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Other suitable consensus mechanism(s) can also be employed. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the DLN (e.g., blockchain network) can include one or more sidechains. A sidechain can be described as a blockchain that validates data from other blockchains. In some examples, a sidechain enables ledger assets (e.g., a digital currency, records of shares or other items, etc.) to be transferred between multiple blockchains. The blockchain may be a public blockchain, such that data stored on the blockchain is generally accessible. The blockchain may be a private (e.g., permissioned) blockchain, such that the stored data is accessible only to authorized individuals and/or processes on the blockchain.

The DLN provides a distributed data storage technology for securely transmitting any suitable type of information without requiring the control of a central authority. The DLN is a distributed database of transactions, repeated in an identical copy in multiple nodes that host the DLN. Cryptography can be used to ensure that the copies are identical and that no transaction is duplicated, and to enforce specific permissions for reading the stored data. The DLN can order and validate the transactions in the stored data to achieve the consensus according to different models and rules. The DLN, such as a network of blockchains, may store data immutably such that a record stored on the DLN may not be altered or removed after it has been stored.

In some implementations, a user is granted one or more points for using the micro-lending service described herein. The points may also be described as reward points or loyalty points. A number of points may be granted to the user in response to the user applying for and/or receiving approval for a loan to purchase a product or service through a merchant. In some implementations, the point data for one or more users can be stored on the DLN, and institutions (e.g., banks) that have opted to participate in the micro-lending service (e.g., grant loans) may have access to the DLN to view and/or update point data for users. Accordingly, the DLN may be a permissioned (e.g., private) DLN that is accessible to authorized entities (e.g., participating institutions). The points may be used by a user across the different institutions. For example, points earned by a user for borrowing from institution A may be redeemed for value at institution B. Accordingly, the system can be described as a clearinghouse for reward points that can be used within the group of participating institutions.

The DLN may store a record of each transaction through which a user earns, or expends, points. The record may be associated with the user through use of a unique identifier (ID) of the user, such as a wallet ID. For example, the DLN may store a first record describing a transaction in which wallet ID 12345 earned 10 points, and a second record describing a transaction in which wallet ID 12345 spent 5 points. Transaction records may also indicate the source of earned points (e.g., which institution), or the recipient of spent points. Transaction records may also include a timestamp (e.g., date and/or time) indicating when the points were earned or spent.

In some implementations, a user can access the UI of an application, such as application 104, to view point data. For example, the UI can be accessed to view a user's current balance of points, recent transactions to earn or spend points, account history, current loan information, loan application information, and so forth. A points balance can be determined by accessing the DLN and adding up the current points balance based on the stored transactions that described earned or spent points.

In some implementations, the starting screen of application 104 may be a camera view showing the field of view of the camera. The camera can be activated to capture an image of the object that the user is interested in purchasing. The image may be analyzed in real time to generate the AR overlay information which is displayed over and/or adjacent to the image of the object. The AR overlay information can include an identification of the product, description of product details, and/or loan data for purchase of the product. In some implementations, a 3-dimensional model may be generated based on the captured image(s) and presented in the AR UI 124 in addition to or instead of displaying the image(s) with the context overlay.

In some implementations, a machine learning (ML) trained model can be employed to identify the product in the captured image(s). In some examples, the model can be trained and used on the same device. Alternatively, the model can be used on the user device 102 to identify objects in the object image(s) 110, and trained elsewhere such as on server device(s) 118. Using the model locally on the same device that is used to capture image(s) and present the AR overlay can reduce latency in the identification of objects that may otherwise occur due to delays in network communications to and from a remote device where the model is executing. The model may be downloaded to user device 102, and periodically retrained (e.g., on the server device(s) 118) and updated to the user device 102.

Any suitable ML algorithm(s) or technique(s) may be employed to identify the object(s) in the image(s). For example, deep learning techniques such as convolutional neural networks (CNNs) may be employed. Object detection by the model may employ tensor flow, a You Only Look Once (YOLO) algorithm, and/or other suitable techniques.

In some implementations, the approval of a loan to the user may trigger the disbursement of funds to the user through a transaction to add funds to an account of the user, which the user may be indicated when registering with the micro-lending service. Alternatively, the funds may be distributed to the merchant who may then provide the product to the user. Each institution that opts into the service may configure a maximum amount of a loan that can be provided to users, and/or other parameters that govern the loans.

Figure 2:
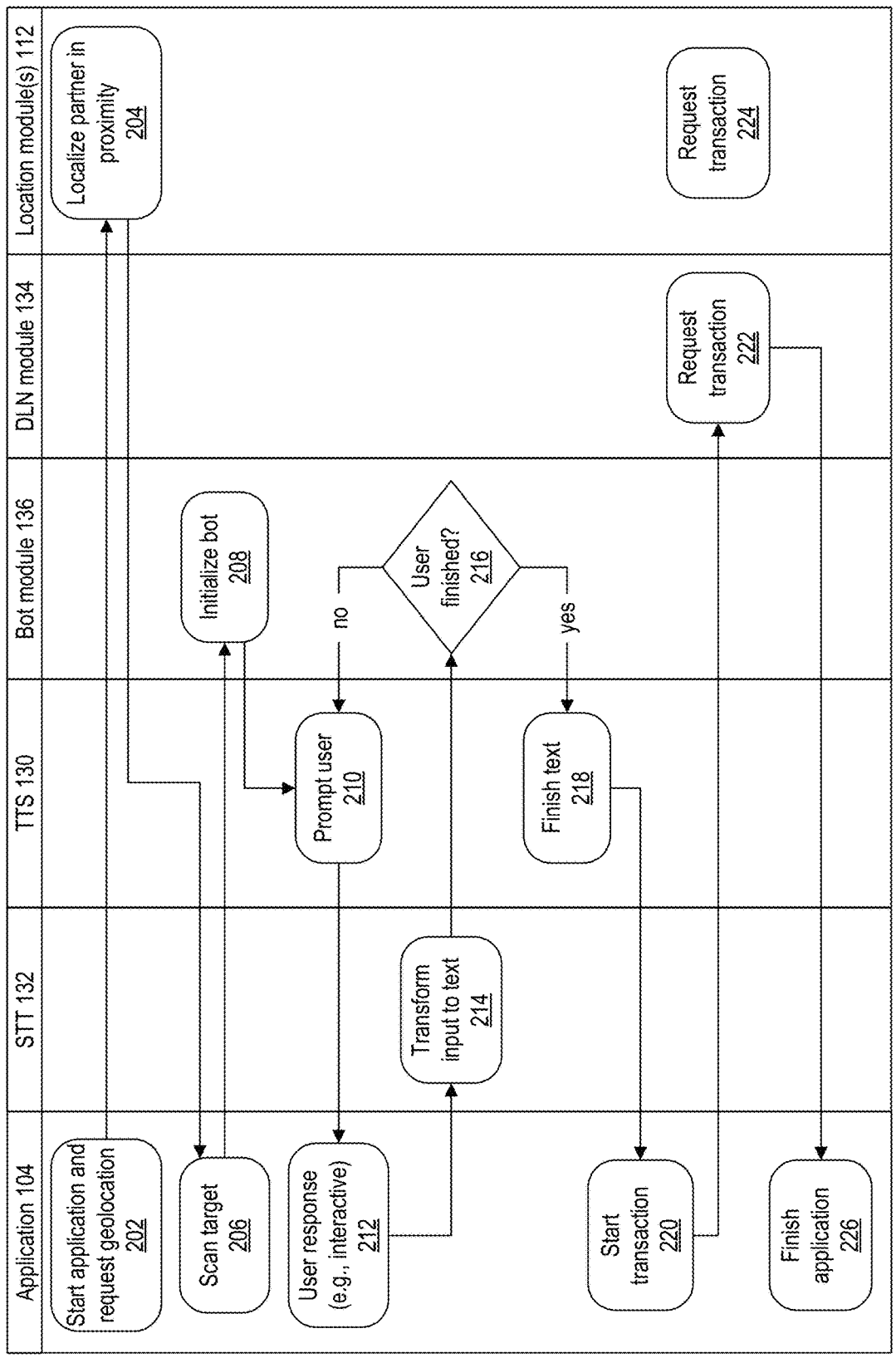
FIG. 2 depicts a flow diagram of an example process, according to implementations of the present disclosure.

FIG. 2 depicts a flow diagram of an example process for image analysis, context data presentation, and interactive loan negotiation through an AR interface, according to implementations of the present disclosure. Operations of the process can be performed by one or more of the application 104, the analysis module(s) 120, and/or other software module(s) executing on the user device 102, the server device(s) 118, or elsewhere.

The application 104 is launched (202), and a determination is made of the current location of the user device 102, through geolocation and/or other techniques. Based on the determined current location, one or more merchant partners can be determined (204) in proximity to the current location of the user device 102. The application 104 can then present features that are usable to capture product images for analysis.

A target object (e.g., product for sale at the merchant) is scanned (206) and one or more images of the object are captured by a camera of the user device 102. In response to the image capture, the interactive bot can be initialized (208) and a communication session can be initiated with the user through the application 104. The communication session can include any appropriate number of communications between the user and a service representative. In some implementations, the bot is at least partly automated and takes the place of a human service representative, such that the user interacts with the bot. In such instances, the bot may have been trained, using machine learning or other suitable techniques, to respond appropriately to the queries of the user and information provided by the user during the communication session. In some implementations, the bot operates to provide a communication interface to the human service representative, who can then communicate with the user through the communication session.

The user may be initially asked (210) what they want to do. The user can respond (212) through the communication session. In instances where the session is a voice session, the input can be transformed to text (214). The bot and/or service representative can then analyze the response and follow up as appropriate. The session may continue in this manner until the user indicates they are finished communicating (216). For example, the session may continue until the user and the bot (or service representative) have agreed on the terms of a loan for the user. On completion, the application can present (218) an indication that the session is over, and can also present the finalized terms of the loan in the AR UI. The user can use the application 104 to request that the loan transaction be initiated (220). The transaction can be requested (222 and 224) by the module(s) 134 and/or 112 respectively, and the application 104 can be closed (226). The transaction can include the initiation of a transfer of funds from the lender into a bank account of the user. The user can then use the transferred funds to complete the purchase of the object.

In some implementations, the transaction further includes updating point data for the user that is stored on the DLN.

The point data can be updated to reward the user with additional points, based on the user agreeing to the loan and the transaction being completed. Such points can be subsequently used by the user to offset the cost of future purchases of products through the merchant partners. In some implementations, the points can also be redeemable for other types of value. The points can be provided by the lenders that are partners in the service, and the value provided when points are redeemed (e.g., the product discounts) can also be provided by the lender partners.

Implementations provide tools that allow a user to have richer and more useful interactions with the products they wish to buy. Using the AR system described herein, the user can identify a product using image analysis (e.g., through scanning a QR code), and then use the application to receive assistance in shopping for the product and obtaining a loan to purchase the product. Moreover, through the AR interface, the user can see detailed information regarding the product, and see possible ways to use previously accrued points to receive a discount on the product. The AR interface also provides the user with alternatives for payment, such as taking out a loan to finance the purchase. A DLN can be used for point data storage and updates, to provide secure, encrypted, access-controlled, and immutable data storage to track loyalty points for users. This solution integrates, and provides convenient access to, all the credit information that can typically be difficult and time-consuming to obtain using traditional, previously available solutions. Implementations can be applicable to any appropriate type of retain business, and/or in other scenarios.

Figure 3:
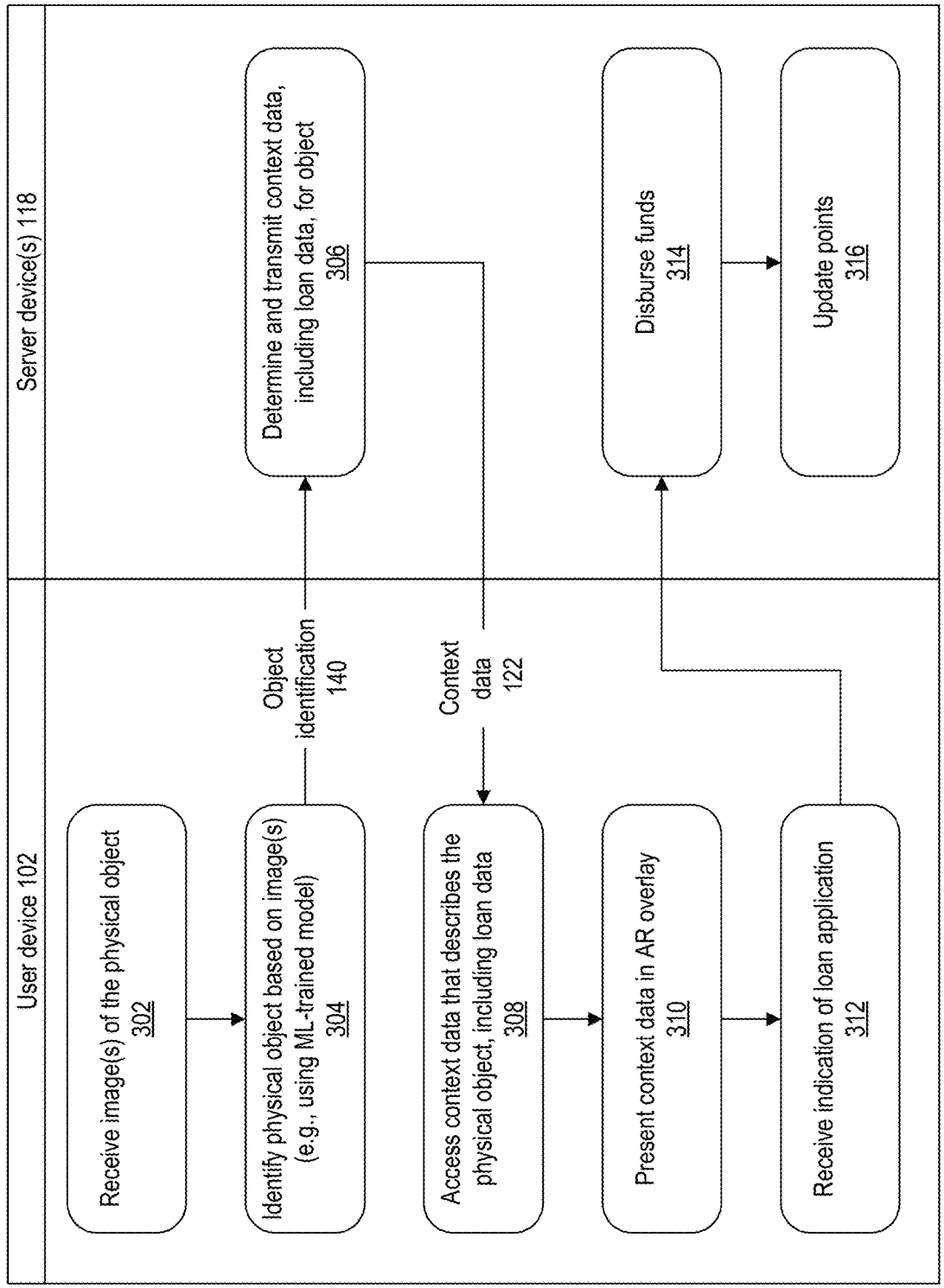
FIG. 3 depicts a flow diagram of an example process, according to implementations of the present disclosure.

FIG. 3 depicts a flow diagram 300 of an example process, according to implementations of the present disclosure. Operations of the process can be performed by one or more of the application 104, the location module(s) 112, the model(s) 142, the analysis module(s) 120, and/or other software module(s) executing on the user device 102, the server device(s) 118, or elsewhere. Although this example shows operations performed on the user device 102 and server device(s) 118 respectively, operations can be performed on other device(s) as appropriate. For example, the determining of context data for an object can be performed at least partly on the user device 102.

At least one image of the physical object 108 is received (302). As described above, the at least one image can be generated using a camera of the user device 102. The physical object can be identified (304) based on an analysis of the image(s) that is performed on the user device 102 or elsewhere. In some implementations, the object identification is performed by providing the at least one image to the model(s) 142 that are trained using ML to identify the physical object based on one or more input images. The model(s) 142 may execute on the user device 102 or elsewhere, as described above.

In some implementations, the object identification 140 is communicated to the server device(s) 118, where context data 122 is determined (306) for the identified object. The context data 122 can include loan data describing a loan to facilitate the purchase of the object. The context data 122, including the loan data, can be communicated to the user device 102. Generation of the context data can include accessing a database on the server device(s) 118 or elsewhere to retrieve information describing the object, such as brand name, model name, product identifier (e.g., SKU), technical specifications, product reviews, pricing information, seller information, manufacturer information, and so forth. In some examples, at least a portion of the context data can be generated on the user device 102 by accessing product data that is stored on the user device 102 or elsewhere.

The received (or otherwise generated) context data 122 can be accessed (308) on the user device 102, and at least a portion of the context data 122 can be presented (310) in the AR overlay on the user device 102. The context data can be presented as an overlay to, or otherwise with, the image(s) of the object.

The AR UI 124 of the application 104 can include control(s) that enable the user to request and/or apply for a loan to purchase the identified object. Using such control(s), a request can be submitted and the application 104 can receive (312) an indication of the loan application. For example, the loan application may be for a loan of at least the amount of the purchase price of the object, as described in the context data. The loan request can be communicated to the server device(s) 118, which can initiate a disbursal (314) of the funds in accordance with the terms of the loan. Funds disbursement may be through a transaction, using an appropriate payment channel, to provide the funds to the user. Alternatively, the funds may be provided directly to the merchant, who may then provide the product to the user.

In some implementations, the points for the user may be updated (316) responsive to the user applying for the loan to purchase the product. The points may be updated on the DLN as described above.

Figure 4:
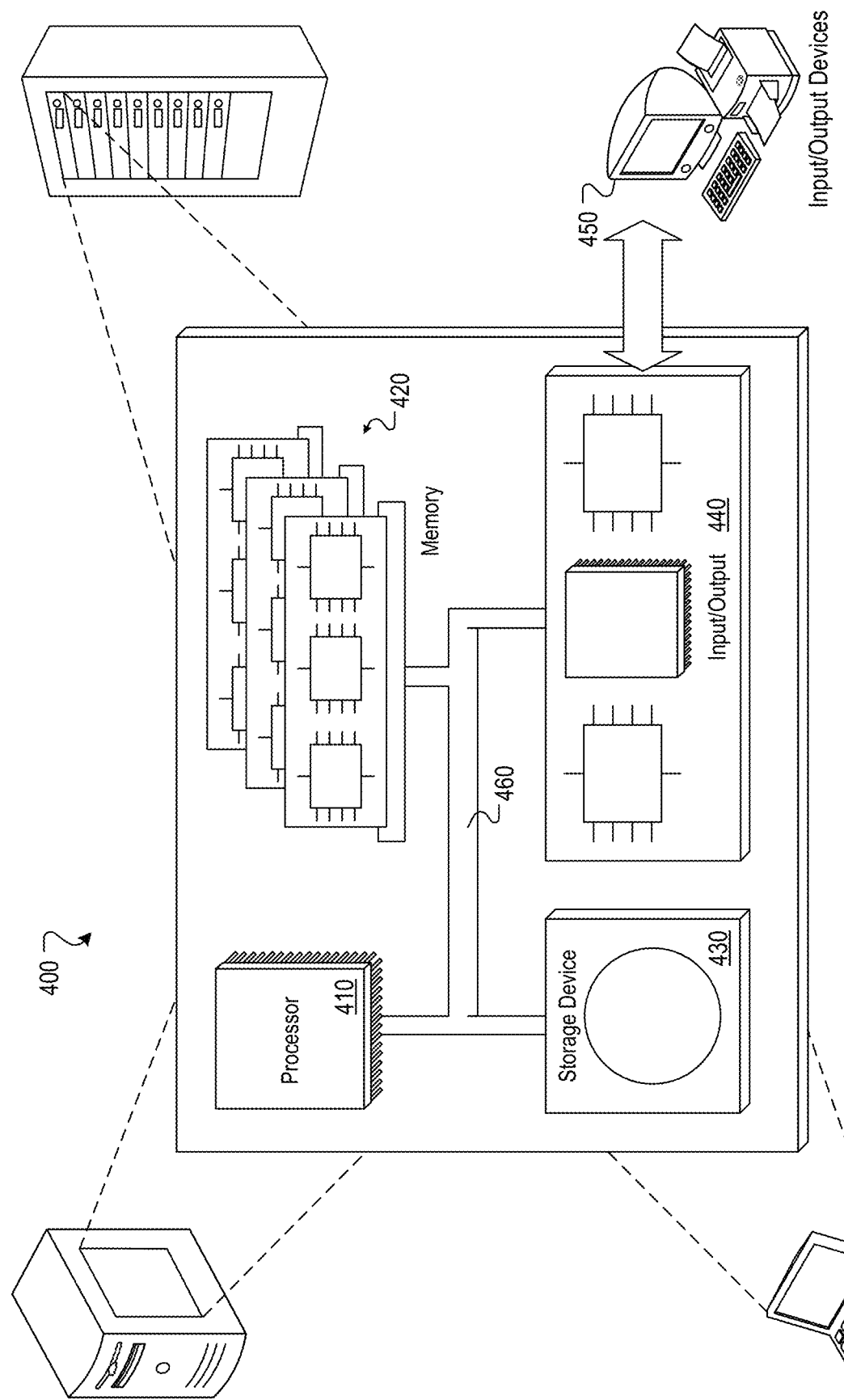
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the user device 102, the server device(s) 118, and/or other computing device(s) or system(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may be non-transitory and may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:
1. A computer-implemented method performed by a portable computing device, the method comprising:
   receiving, by the portable computing device, a model that is trained by a server using machine learning to identify physical objects from images;
   determining, by the portable computing device, a location of the portable computing device based on a global positioning system;
   identifying, by the portable computing device, a partner based on the location of the portable computing device;

launching, by an application executing on the portable computing device and based on the partner that was identified, features used to capture images of objects;

receiving, by the portable computing device, at least one image of a physical object, the at least one image generated with the features launched based on the partner that was identified;

providing the at least one image to the model and receiving, as output from the model, an identification of the physical object, wherein the model is configured to provide an identification of the physical object based on one or more input images and executes on the portable computing device;

providing, to the server, the identification of the physical object;

receiving, from the server and by the portable computing device, context data that describes the physical object, the context data determined based on the identification of the physical object, the context data including loan data that describes terms of a loan to facilitate purchase of the physical object; and presenting the context data including the loan data in an augmented reality (AR) interface executing on the portable computing device, wherein the AR interface shows the loan data overlaid on the at least one image of the physical object that was generated with the features launched based on the partner that was identified.

2. The method of claim 1, wherein presenting the context data further includes initiating a communication session between a user of the portable computing device and a service representative.

3. The method of claim 2, wherein the communication session is one or more of a text chat session and a voice chat session.

4. The method of claim 1, wherein point data for a user of the portable computing device is updated responsive to receiving an indication of a loan application for the loan.

5. The method of claim 4, wherein the point data is stored on a distributed ledger network (DLN).

6. The method of claim 4, further comprising:
receiving, by the portable computing device, the point data describing a current number of points available to the user; and
displaying the point data in the AR interface executing on the portable computing device.

7. The method of claim 1, wherein the context data received from the server includes a textual description of the physical object and the AR interface shows the textual description of the physical object overlaid on the at least one image of the physical object that was generated with the features launched based on the partner that was identified.

8. The method of claim 1, wherein the AR interface includes a text chat session between a user of the portable computing device and a service representative of a bank overlaid on the at least one image of the physical object that was generated with the features launched based on the partner that was identified.

9. A system comprising:
at least one processor; and
memory communicatively coupled to the at least one processor, the memory storing instructions which, when executed, cause the at least one processor to perform operations comprising:
receiving, by a portable computing device, a model that is trained by a server using machine learning to identify physical objects from images;

determining, by the portable computing device, a location of the portable computing device based on a global positioning system;

identifying, by the portable computing device, a partner based on the location of the portable computing device;

launching, by an application executing on the portable computing device and based on the partner that was identified, features used to capture images of objects;

receiving, by the portable computing device, at least one image of a physical object, the at least one image generated with the features launched based on the partner that was identified;

providing the at least one image to the model and receiving, as output from the model, an identification of the physical object, wherein the model is configured to provide an identification of the physical object based on one or more input images and executes on the portable computing device;

providing, to the server, the identification of the physical object;

receiving, from the server and by the portable computing device, context data that describes the physical object, the context data determined based on the identification of the physical object, the context data including loan data that describes terms of a loan to facilitate purchase of the physical object; and presenting the context data including the loan data in an augmented reality (AR) interface executing on the portable computing device, wherein the AR interface shows the loan data overlaid on the at least one image of the physical object that was generated with the features launched based on the partner that was identified.

10. The system of claim 9, wherein presenting the context data further includes initiating a communication session between a user of the portable computing device and a service representative.

11. The system of claim 10, wherein the communication session is one or more of a text chat session and a voice chat session.

12. The system of claim 9, wherein point data for a user of the portable computing device is updated responsive to receiving an indication of a loan application for the loan.

13. The system of claim 12, wherein the point data is stored on a distributed ledger network (DLN).

14. The system of claim 12, the operations further comprising:
receiving the point data describing a current number of points available to the user; and
displaying the point data in the AR interface executing on the portable computing device.

15. One or more non-transitory computer-readable storage media storing instructions which, when executed, cause at least one processor to perform operations comprising:
receiving, by a portable computing device, a model that is trained by a server using machine learning to identify physical objects from images;

determining, by the portable computing device, a location of the portable computing device based on a global positioning system;

identifying, by the portable computing device, a partner based on the location of the portable computing device;

launching, by an application executing on the portable computing device and based on the partner that was identified, features used to capture images of objects;

receiving, by the portable computing device, at least one image of a physical object, the at least one image generated with the features launched based on the partner that was identified;

providing the at least one image to the model and receiving, as output from the model, an identification of the physical object, wherein the model is configured to provide an identification of the physical object based on one or more input images and executes on the portable computing device;

providing, to the server, the identification of the physical object;

receiving, from the server and by the portable computing device, context data that describes the physical object, the context data determined based on the identification of the physical object, the context data including loan data that describes terms of a loan to facilitate purchase of the physical object; and presenting the context data including the loan data in an augmented reality (AR) interface executing on the portable computing device, wherein the AR interface shows the loan data overlaid on the at least one image of the physical object that was generated with the features launched based on the partner that was identified.

16. The one or more computer-readable storage media of claim 15, wherein point data for a user of the portable computing device is updated responsive to receiving an indication of a loan application for the loan.

17. The one or more computer-readable storage media of claim 16, wherein the point data is stored on a distributed ledger network (DLN).

18. The one or more computer-readable storage media of claim 16, the operations further comprising:

receiving the point data describing a current number of points available to the user; and displaying the point data in the AR interface executing on the portable computing device.

* * * * *